United States Patent [19]

Baum

[11] Patent Number: 5,601,657
[45] Date of Patent: *Feb. 11, 1997

[54] TWO-STEP CHEMICAL CLEANING PROCESS

[75] Inventor: Allen J. Baum, Pittsburgh, Pa.

[73] Assignee: Westinghouse Electric Corporation, Pittsburgh, Pa.

[*] Notice: The portion of the term of this patent subsequent to May 9, 2012, has been disclaimed.

[21] Appl. No.: 427,318

[22] Filed: Apr. 24, 1995

Related U.S. Application Data

[63] Continuation-in-part of Ser. No. 105,571, Aug. 13, 1993, Pat. No. 5,413,168.
[51] Int. Cl.$^6$ ............................... B08B 3/10; B08B 9/00
[52] U.S. Cl. ........................ 134/3; 134/22.1; 134/22.18; 134/26; 134/30; 134/35; 165/95
[58] Field of Search ........................ 134/1, 3, 10, 22.13, 134/22.14, 22.18, 26, 27, 28, 29; 165/95; 122/379

[56] References Cited

U.S. PATENT DOCUMENTS

| | | | |
|---|---|---|---|
| 3,248,269 | 4/1966 | Bell | 134/2 X |
| 3,527,609 | 9/1970 | Vinso | 134/22.14 X |
| 4,632,705 | 12/1986 | Baum | 134/22.18 X |
| 5,413,168 | 5/1995 | Baum | 165/95 |

OTHER PUBLICATIONS

"High Temperature Chemical Cleaning at Byron Unit One"—A presentation given by Wes Scheffler on Jan. 10, 1995, at the Technical Exchange Conference in Glenn Rose, Texas, sponsored by Texas Utilities.

Primary Examiner—Jill Warden
Assistant Examiner—Saeed Chaudhry
Attorney, Agent, or Firm—David G. Maire

[57] ABSTRACT

An improved method for cleaning heat exchangers, wherein a first cleaning liquid is used to remove a majority of the accumulated sludge and deposits from the surfaces of the heat exchanger, and a second cleaning liquid is used to remove deposits from the crevice regions of the heat exchanger. Boiling may be induced in the crevices between the tubes and the tube support plates by venting of the secondary side while heating through the primary side of the heat exchanger. Repeated venting as the water level is lowered results in crevice boiling at each tube support plate. Mechanical cleaning techniques such as pressure pulse cleaning may be utilized with either or both of the cleaning liquids. Additional liquids may be introduced into the heat exchanger to provide further cleaning action or to facilitate flushing of the previous cleaning liquids.

21 Claims, 3 Drawing Sheets

TWO-STEP CHEMICAL CLEANING PROCESS

BACKGROUND OF THE INVENTION

This application is a continuation-in-part of Ser. No. 08/105,571 filed Aug. 13, 1993, now U.S. Pat. No. 5,413,168.

This invention relates generally to the cleaning of the interior of vessels, and is specifically concerned with the cleaning of sludge, debris and deposits from the shell side of a heat exchanger which has crevice regions. This invention has particular application to the cleaning of nuclear steam generators where the sludge and debris may be radioactive and where deposits in crevice regions may be particularly detrimental to the longevity of the steam generator.

There are many methods known in the prior art for cleaning heat exchangers. Among the known methods are the chemical cleaning processes taught in U.S. Pat. No. 4,686,067 entitled "Process for Eliminating Deposits Formed in a Steam Generator of a Pressurized Water Nuclear Reactor" and U.S. Pat. No. 4,720,306 entitled "Cleaning Method". Chemical cleaning techniques are limited by concerns regarding corrosion of the heat exchanger components. Cleaning agents which are effective in dissolving deposits are generally detrimental to the structures of the heat exchanger. Therefore, the concentration of the cleaning agent and the duration of the cleaning process are typically limited. Furthermore, because the concentration of the cleaning solution is limited, depletion of the active cleaning solution prior to complete cleaning of the crevice regions is common. In order to increase the concentration of cleaning solution in the crevice regions, U.S. Pat. No. 4,632,705 entitled "Process for the Accelerated Cleaning of the Restricted Areas of the Secondary Side of a Steam Generator" teaches a process which induces flash boiling of the cleaning solution by a reduction of pressure in the heated cleaning solution. However, the effectiveness of this technique is also limited when the concentration of active cleaning solution is depleted in the bulk solution.

Mechanical cleaning methods avoid the corrosion concern of the chemical methods. Among the mechanical methods known in the prior art are U.S. Pat. No. 4,756,770 entitled "Water Slap Steam Generator Cleaning Method" and U.S. Pat. No. 4,972,805 entitled "Method and Apparatus for Removing Foreign Matter from Heat Exchanger Tubesheets" and U.S. Pat. No. 5,006,304 entitled "Pressure Pulse Cleaning Method". Such mechanical methods are limited by the amount of force which can be exerted on the accumulated sludge and deposits without creating damage to the structures of the heat exchanger.

SUMMARY OF THE INVENTION

In light of the limitations of the prior art discussed above, it is an object of this invention to provide a method for cleaning heat exchangers which provides effective removal of sludge and deposits from the surfaces of the interior of a heat exchanger as well as from the crevice regions of the heat exchanger interior, and to do so without excessive corrosion or mechanical damage to the heat exchanger components.

This invention discloses a method for cleaning a heat exchanger having a primary and a secondary side defined by a plurality of tubes, the tubes being supported by a plurality of tube support plates spaced apart from the secondary side of the tubes by a plurality of crevice regions, the secondary side having deposits on its surfaces and in the crevice regions, the method including the steps of: introducing a first cleaning liquid into the secondary side; supplying heat to the first cleaning liquid through the tubes from the primary side while maintaining a pressure above the first cleaning liquid equal to or greater than the saturation pressure; reducing the pressure above the first cleaning liquid to below the boiling point pressure to effect boiling of the first cleaning liquid in the crevice regions of at least a first of the tube support plates; terminating the step of reducing the pressure and returning the pressure above the first cleaning liquid to at least the saturation pressure; removing at least a portion of the first cleaning liquid; introducing a second cleaning liquid into the secondary side; maintaining the second cleaning liquid within the secondary side a sufficient time for penetration of the second liquid into the crevice regions; and finally, draining the secondary side of the heat exchanger.

DESCRIPTION OF THE PREFERRED EMBODIMENTS

Figure 1:
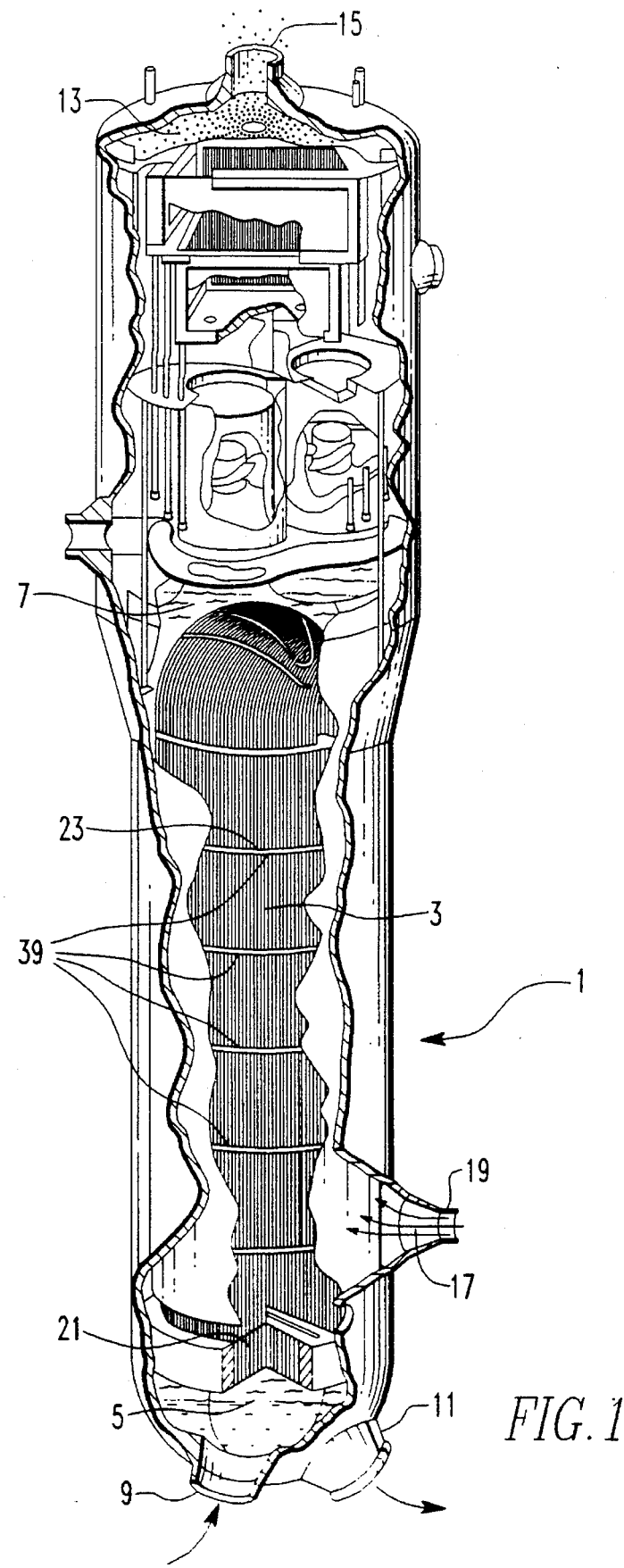
FIG. 1 illustrates a nuclear plant steam generator which can be cleaned by the method of this invention.

FIG. 1 illustrates a steam generating heat exchanger 1 which is typical of the vessels which can be cleaned by this invention. The heat exchanger of FIG. 1 contains numerous tubes 3, in this case U-shaped tubes, which serve as a pressure boundary between primary fluid 5 on the inside of the tubes and secondary fluid 7 surrounding the outside of the tubes. In a nuclear power plant, primary coolant water 5 which is heated in the reactor is supplied to the steam generator 1 via an inlet nozzle 9. This water travels through the tubes, thereby transferring heat energy to secondary water 7 contained in the shell side of the steam generator 1. After traversing the tubes, the primary water 5 exits the steam generator 1 via an outlet nozzle 11. The water 7 in the secondary side of the steam generator 1 is at a lower pressure than the water 5 in the primary side, and it is boiled by the hot primary side fluid 5, thereby providing steam 13 to the turbine/generator via a steam outlet nozzle 15. The shell side of the steam generating heat exchanger 1 is a natural collection point for sludge and debris. As the water 7 in the steam generator 1 is converted to steam 13 and exits the heat exchanger 1, it is resupplied by makeup water 17 through a feedwater nozzle 19. Any solids mixed with the makeup water 17 which are not volatile will accumulate in the secondary side of the heat exchanger 1. Furthermore, solids may be collected by precipitating from solution. Sludge and deposits will accumulate in any regions of low flow, such as the crevice region 21 between a tube and the tube sheet, or the crevice region 23 between a tube and a tube support plate.

Sludge and deposit accumulations are undesirable because they interfere with the heat transfer process and because they provide low flow regions which can serve to accelerate corrosion of the heat exchanger components. Accumulated sludge and deposits may be removed from the heat exchanger during scheduled maintenance outages. Mechanical techniques for loosening the sludge are limited by the amount of force which can safely be exerted on the heat exchanger components. Chemical cleaning agents are often ineffective in penetrating the deposits located within crevice regions because the amount of active cleaning agent in solution is depleted by the large surface area of deposits and sludge available to the cleaning solution in the bulk volume of the heat exchanger.

Figure 2:
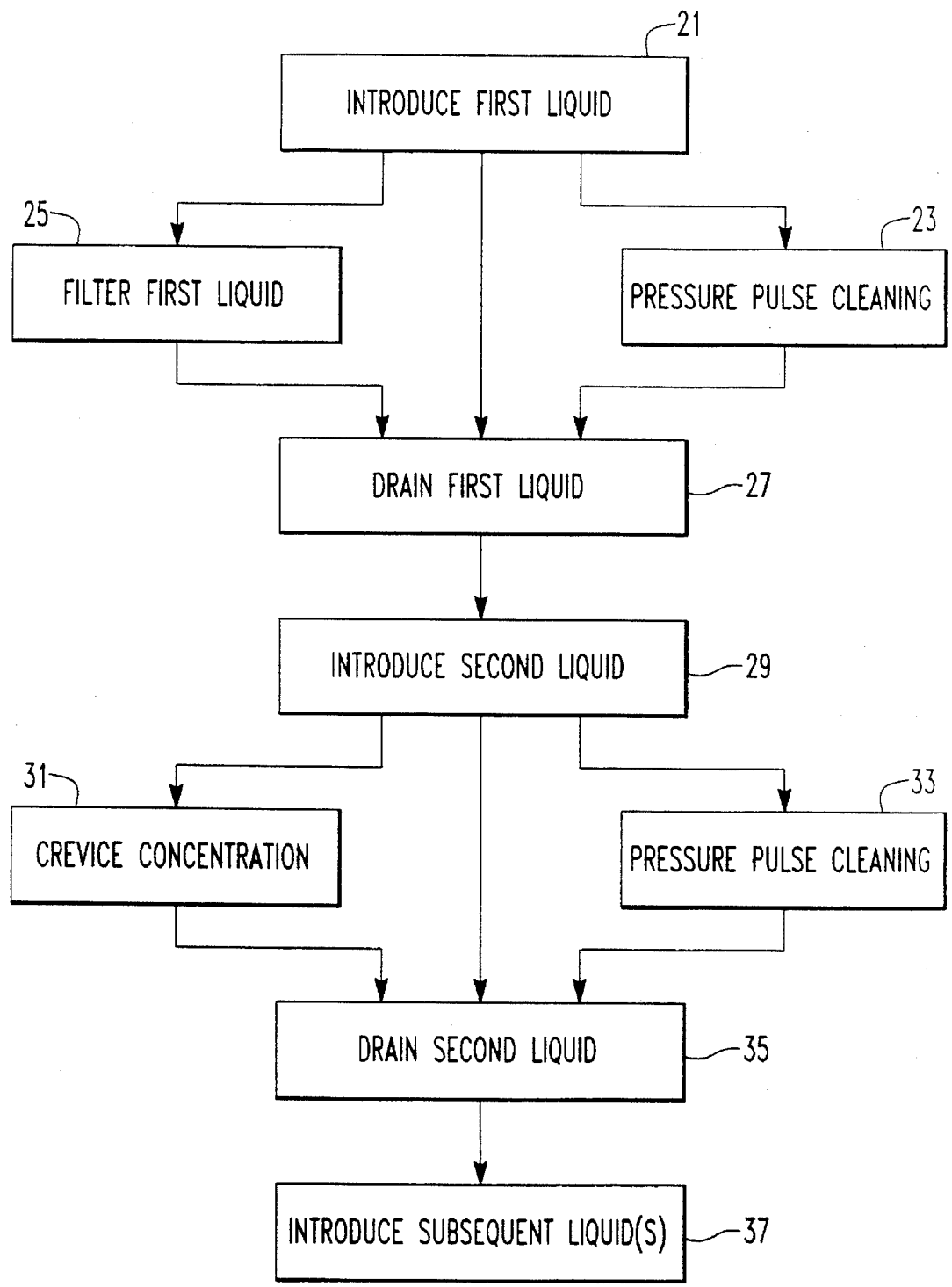
FIG. 2 is a flow chart illustrating the steps of a cleaning method performed in accordance with this invention.

An improved method of cleaning a heat exchanger is illustrated by the flow chart of FIG. 2. The first step 21 of this improved process is to introduce a first liquid containing a cleaning agent in the heat exchanger. The liquid is typically water, and the cleaning agent may be one or more chemicals known in the art; for example, EDTA, NTA, or gluconic acid. Typical concentrations of the cleaning agent may be from approximately 2% to 10% by weight, and are preferably from approximately 5% to 8% by weight. Concentrations may be as high as 20% for some heat exchangers with a high sludge burden.

In order to facilitate the loosening and removal of sludge and deposits, a step 23 may be included to generate a series of pressure waves or pulses in the first liquid to provide a mechanical cleaning action. This type of mechanical cleaning is often referred to as pressure pulse cleaning, and it is more fully described in U.S. Pat. No. 5,006,304, issued to Franklin et al., assigned to Westinghouse Electric Corporation, and incorporated herein by reference.

Once portions of the sludge and deposits are loosened, they are typically dissolved by the action of the chelant. In some situations, it may be desirable to include a filtering step 25 to remove particles of the sludge and deposits by recirculating the first liquid through a filtering system. Particles of sludge and deposits will be entrained in the flowing liquid and can be transported out of the heat exchanger by any recirculation system known in the art. One such recirculation system is described in U.S. Pat. No. 5,019,329 issued to Franklin et al., assigned to Westinghouse Electric Corporation, and incorporated by reference herein.

Because of the large amount of sludge and deposits normally found in a heat exchanger, sufficient cleaning solution must be provided to prevent its depletion. The effectiveness of the free chelant in a cleaning solution decreases as the inventory of complexed chelant increases. Furthermore, as the sludge and deposits are dissolved, the level of ferric ions in the first liquid will rise. Ferric ions are undesirable because they tend to aggravate the corrosion of the heat exchanger components. Therefore, the next step 27 in the improved cleaning process is to remove the first liquid from the heat exchanger, preferably by draining the liquid through the recirculation system while maintaining the mechanical agitation caused by the pressure pulse waves. For a typical application of this process in a nuclear power plant steam generator, the preferred duration of exposure of the heat exchanger to the first liquid may be from approximately 2 to 10 hours, although it may be more for highly fouled units.

At this stage of the cleaning process the majority of the sludge and surface deposits will have been removed from the heat exchanger. However, the deposits in the crevice regions may not have been completely removed because of the depletion of the active cleaning agents in the first liquid. The next step 29 in this improved cleaning process is therefore to introduce a second liquid into the heat exchanger. The second liquid is also typically water and it may contain any one or more of the cleaning agents known in the art. Since the majority of sludge and deposits were removed with the first liquid, there will be a minimum of ferric ions released into the second liquid. As a result, the concentration of cleaning agents can be higher in the second liquid than that used in the first liquid, since corrosion concerns are reduced. Typical second liquid cleaning agent concentrations are on the order of twice the concentration used with the first liquid, and they may range from approximately 4% to 20%. Furthermore, the length of time of exposure of the heat exchanger to the second liquid can be longer than the exposure to the first liquid. Typical durations of exposure to the second liquid may be from approximately 4 to 24 hours or longer. The duration selected should be adequate for penetration of the second liquid into the crevice regions. Since the concentration of active cleaning solvent is not being depleted by a large volume of sludge and deposits, essentially all of the solvent in the second liquid is available for dissolution and/or entrainment of the crevice deposits. In order to increase the concentration of solvent in the crevice regions, the technique taught in U.S. Pat. No. 4,632,705, incorporated by reference herein, may be used as a next step 31. With this technique, the second liquid is heated, then its pressure reduced to induce flash boiling within the crevice regions. The boiling action concentrates the cleaning agent in the crevice regions when compared to the concentration in the bulk of the second liquid.

A further step 33 of mechanical cleaning action may also be utilized while the second liquid is contained in the heat exchanger. Any of the mechanical cleaning techniques known in the art may be used, for example, pressure pulse or water slap techniques.

The second liquid is then removed from the heat exchanger in step 35. Further steps 37 of introducing additional liquids into the heat exchanger in succession may be utilized as necessary for further cleaning and/or flushing; for example, for a copper removal step. If additional liquids are used for cleaning, the concentration of cleaning agents and/or the duration of exposure of the heat exchanger to the cleaning agent can be increased for each succeeding liquid, since the heat exchanger will become increasingly clean as total inventory of sludge and deposits is gradually removed from the heat exchanger by the successive liquids. This reduction of sludge results in a reduction of free ferric ions, thereby reducing the potential for galvanic corrosion of the heat exchanger components from the successively higher concentrations of cleaning agents.

In addition to providing improved crevice cleaning, this process also simplifies the waste handling associated with the cleaning of nuclear plant heat exchangers. The first liquid has a relatively low concentration of cleaning agent, and it can be handled with conventional nuclear steam generator chemical cleaning waste processing technology. The second liquid, which likely has a higher concentration of cleaning agent, may be treated as a chemical waste rather than as a mixed waste, since essentially all of the radioactivity is removed with the first liquid.

Figure 3:
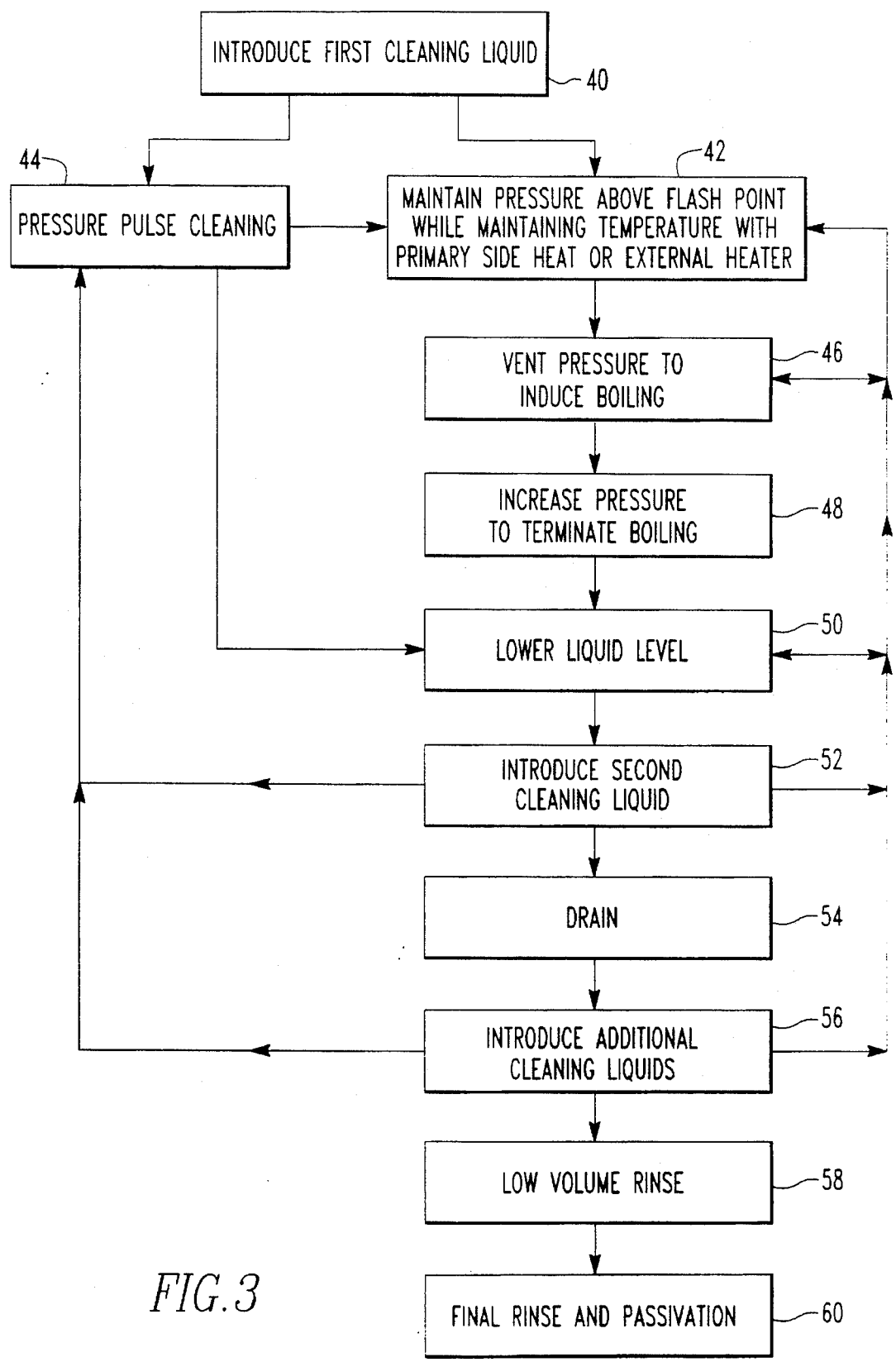
FIG. 3 is a flow chart illustrating the steps of a cleaning method performed in accordance with the invention.

FIG. 3 illustrates another embodiment of this invention which may be particularly useful for nuclear steam generators or other heat exchangers having a primary and secondary side defined by a plurality of tubes which are supported on the secondary sided by a plurality of tube support plates spaced apart from the secondary side of the tubes by a plurality of crevice regions. As illustrated in FIG. 1, the tube support plates 39 are spaced apart vertically in the steam generator. In the cleaning process illustrated in FIG. 3, a first cleaning liquid is introduced 40 into the secondary side of the heat exchanger. The first cleaning liquid may contain any number of cleaning agents capable of solubilizing the deposits expected in the heat exchanger; for example, in the case of a nuclear steam generator where ferrous material containing deposits are expected, the cleaning fluid may be water containing ammoniated ethylenediaminetetracetic acid (EDTA) in concentrations, for example, of 25–200 grams/liter or more, depending on the amount of the deposits expected. The amount of cleaning agent used is selected to be sufficient to solubilize a majority of the deposits from the surfaces of the heat exchanger.

The first cleaning liquid may be heated to improve and speed its cleaning ability. As taught in U.S. Pat. No. 4,632,705, the liquid may be heated to an elevated temperature of about 120–135 degrees Celsius (248–275 degrees Fahrenheit). Temperatures above this level, for example 275–350 degrees Fahrenheit, or higher, may also be used with certain cleaning agents, such as EDTA. For nuclear steam generators, a temperature of about 350 degrees is a practical upper limit due to cooling system operating limitations during plant shutdown, and a temperature of about 290 or 300 degrees Fahrenheit may be preferred. The cleaning liquid may be preheated prior to being introduced into the heat exchanger, may be heated by an external auxiliary heat source, and/or may be heated by supplying heat through the tubes from the primary side of the heat exchanger. When the desired temperature is above the normal boiling point of the liquid, the gas pressure above the first cleaning liquid is maintained equal to or greater than the saturation pressure while heat is supplied through the tubes from the primary side 42. In some applications, it may be desirable to perform a pressure-pulse cleaning step 44 with the first cleaning liquid by generating a series of pressure waves within said first liquid in order to loosen the sludge and deposits in the secondary side.

The gas pressure over the first cleaning liquid may be reduced by venting or spraying or other means in order to effect boiling or flashing of the liquid 46. Such boiling will occur in the crevices between the tubes and the tube support plates, thereby increasing the concentration of the cleaning agent and providing some mechanical energy to the deposits in this area. The pressure reduction step 46 may be accomplished by opening a power operated relief valve or steam dump valve associated with the secondary side of the heat exchanger. The depth in the first cleaning liquid to which boiling will be induced will depend on the amount of the reduction of the pressure. Opening of relief valves for short periods may reduce the pressure by 5–40 psi. It is desirable to reduce the pressure an amount sufficient to induce boiling in the crevices of at least one of the tube support plates. Once the venting is terminated, the pressure is allowed to increase to at least the saturation pressure 48. Nitrogen or other gas may be injected to increase the pressure to above the saturation pressure in order to ensure that all vapor bubbles in the crevice regions are collapsed, thereby improving the cleaning effectiveness of the process. If the obtainable pressure decrease during venting step 46 is not sufficient to induce boiling deep enough into the first cleaning liquid depth to encompass all of the tube support plates, the level of the first cleaning liquid can be lowered 50, then the venting and pressure reduction step 46 repeated to induce boiling in the crevice of a lower tube support plate. The step of lowering the first liquid level 50 will also serve to remove a portion of the solubilized deposits from the heat exchanger. Repeating the step of reducing pressure 46 a plurality of times will result in a loss of volume of the cleaning liquid from the secondary side of the heat exchanger. The mass loss through venting as well as through any supplemental draining which is performed coincidentally will gradually remove a portion of the cleaning liquid and lower the level of the liquid in the secondary side and will effect boiling in the crevice regions of a plurality of the tube support plates in succession as the liquid level drops.

After the first cleaning liquid has solubilized a majority of the surface deposits in the heat exchanger, and preferably after a portion of the first cleaning liquid has been removed, a second cleaning liquid may be introduced 52 into the secondary side of the heat exchanger. The second cleaning liquid may be the same as, or different from, the first cleaning liquid; for example water containing EDTA in the same or a different concentration, or containing the same or different additives for example to obtain the same or different pH values. The amount of cleaning agent used is preferably sufficient or in excess of the amount needed to solubilize a majority of the remaining deposits from the crevice regions. In nuclear steam generator applications, it may be desirable to use water containing a cleaning agent for removing ferrous deposits from the secondary side surfaces as the first cleaning liquid, and water containing a cleaning agent for removing copper deposits as the second cleaning liquid. Generally, the second cleaning liquid can be more aggressive than the first cleaning liquid, since the concern for corrosion will be lessened by the cleaning action of the first cleaning liquid. Other cleaning agents which may be used include organic acids and salts thereof, including hydroxyethylethylenediaminetriacetic acid (HEDTA), diethylenetriaminepantascetic acid (DTPA), nitrilotriacetic acid (NTA), citric acid, gluconic acid, glutamic acid, polyamines and phosphonate blends, propylenediaminetetrascetic acid (PDTA), and 1,2 cyclohexylenediaminetetraacetic acid (CYDTA).

It may be desirable to use a pressure pulse cleaning step 44 and/or a venting/flashing step 46 with the second cleaning liquid. The second cleaning liquid is maintained in the secondary side a sufficient time for penetration of the second cleaning liquid into the crevice regions to allow for dissolution of crevice deposits before it is drained 54 at least partially from the heat exchanger, along with the solubilized deposits. Additional cleaning liquids may be introduced 56 as appropriate for special cleaning situations, again either with or without pressure pulse cleaning 44 and/or venting and pressure reduction to induce boiling 46.

A low volume rinse step 58 may be used to aid in the removal of sludge, deposits and cleaning liquids, followed by a final step of introducing a rinse and/or chemical passivation liquid 60 to place the heat exchanger again in condition for operation.

This disclosure reveals the preferred embodiment of the invention. However, variations in the form, construction, or arrangement of the invention, and the modified application of the invention are possible without departing from the scope of the invention as claimed.

I claim:

1. A method for cleaning a heat exchanger having a primary and a secondary side defined by a plurality of tubes, said tubes being supported by a plurality of tube support plates spaced apart from the secondary side of said tubes by a plurality of crevice regions, said secondary side having deposits on its surfaces and in said crevice regions, the method comprising the steps of:

introducing a first cleaning liquid into said secondary side;

supplying heat to said first cleaning liquid through said tubes from said primary side while maintaining a pressure above said first cleaning liquid equal to or greater than the saturation pressure;

reducing the pressure above said first cleaning liquid to below the boiling point pressure to effect boiling of said first cleaning liquid in said crevice regions of at least a first of said tube support plates;

terminating the step of reducing the pressure and returning the pressure above said first cleaning liquid to at least the saturation pressure;

removing at least a portion of said first cleaning liquid and solubilized deposits from said secondary side after a first period of time within said secondary side;

introducing a second cleaning liquid into said secondary side;

maintaining said second cleaning liquid within said secondary side a second period of time for penetration of said second cleaning liquid into said crevice regions, said second period of time being longer than said first period of time;

draining said secondary side of said heat exchanger.

2. The method of claim 1, further comprising the step of supplying heat to said first cleaning liquid through said tubes from said primary side in an amount sufficient to maintain said first cleaning liquid at a temperature of between about 248–350 degrees Fahrenheit.

3. The method of claim 1, further comprising the step of supplying heat to said first cleaning liquid through said tubes from said primary side in an amount sufficient to maintain said first cleaning liquid at a temperature of approximately 290 degrees Fahrenheit.

4. The method of claim 1, further comprising the step of repeating the step of reducing the pressure after the step of introducing a second cleaning liquid.

5. The method of claim 1, wherein the step of reducing the pressure is repeated a plurality of times.

6. The method of claim 1, wherein said first cleaning liquid and said second cleaning liquid comprise water containing the same cleaning agent.

7. The method of claim 1, wherein said first cleaning liquid comprises water containing a first cleaning agent for removing ferrous deposits from said surfaces and said second cleaning liquid comprises water containing a second cleaning agent for removing copper deposits.

8. The method of claim 1, wherein said first cleaning liquid comprises water containing about 25–200 grams/liter of ammoniated EDTA.

9. The method of claim 1, wherein the step of reducing the pressure comprises reducing the pressure above said first cleaning liquid by about 5–40 psi.

10. The method of claim 1, wherein the step of reducing the pressure comprises opening a steam dump valve associated with said secondary side.

11. The method of claim 1, further comprising the step of:

after the step of removing at least a portion of said first cleaning liquid and before the step of introducing a second cleaning liquid, performing the step of reducing the pressure above said first cleaning liquid to below the boiling point pressure in order to effect boiling in said crevice regions of at least a second of said tube support plates.

12. The method of claim 1, wherein the step of reducing the pressure is repeated a plurality of times, coincident with removing a portion of said first cleaning liquid from said secondary side, and thereby effecting boiling in said crevice regions of a plurality of said tube support plates in succession.

13. A method of cleaning the crevices on the secondary side of a steam generator having surfaces and crevices, the method comprising the steps of:

introducing a first cleaning liquid into said secondary side of said steam generator, said first cleaning liquid containing an amount of cleaning agent sufficient to solubilize a majority of the deposits on said surfaces;

maintaining said first cleaning liquid within said steam generator for a a first period of time to solubilize a majority of the deposits on said surfaces;

removing a portion of said first cleaning liquid containing solubilized deposits from said steam generator;

introducing a second cleaning liquid into said secondary side of said steam generator;

maintaining said second cleaning liquid within said steam generator a second period of time for penetration of said second liquid into said crevices, wherein said second period of time is longer than said first period of time;

draining said secondary side of said steam generator.

14. The method of claim 13, further comprising the step of generating a series of pressure waves within said first cleaning liquid.

15. The method of claim 13, further comprising the step of generating a series of pressure waves within said second cleaning liquid.

16. The method of claim 13, further comprising the steps of:

supplying heat to said first cleaning liquid from a primary side of said steam generator while maintaining a pressure above said first cleaning liquid higher than the boiling point pressure.

17. The method of claim 16, further comprising the step of:

reducing said pressure to below the boiling point pressure to effect boiling of said first cleaning liquid in at least a portion of said crevices.

18. The method of claim 13, wherein said first cleaning liquid and said second cleaning liquid comprise the same cleaning agent.

19. The method of claim 13, further comprising the steps of:

heating said second cleaning liquid while maintaining a pressure above said second cleaning liquid of at least the saturation temperature;

reducing said pressure to below the boiling point pressure to effect boiling of said second cleaning liquid in at least a portion of said crevices.

20. A method for cleaning a heat exchanger having a primary and a secondary side defined by a plurality of tubes, said tubes being supported by a plurality of tube support plates spaced apart from the secondary side of said tubes by a plurality of crevice regions, said secondary side having deposits on its surfaces and in said crevice regions, the method comprising the steps of:

introducing a first liquid containing a cleaning agent into said secondary side;

maintaining said first liquid in said secondary side for a first time period sufficient to solubilize at least a portion of said deposits from said surfaces of said secondary side;

removing at least a portion of said first liquid and said solubilized deposits contained therein from said secondary side;

introducing a second liquid containing a cleaning agent into said secondary side;

supplying heat to said second liquid through said tubes from said primary side while maintaining a pressure on said secondary side equal to or greater than the saturation pressure;

reducing the pressure on said secondary side to below the boiling point pressure to effect boiling of said second liquid in said crevice regions of at least a first of said tube support plates;

terminating the step of reducing the pressure and returning the pressure on said secondary side to at least the saturation pressure;

wherein said second liquid is maintained within said secondary side for a second time period sufficient to solubilize deposits in said crevice regions, said second time period being longer than said first time period.

21. A method for cleaning a heat exchanger having a primary and a secondary side defined by a plurality of tubes, said tubes being supported by a plurality of tube support plates spaced apart from the secondary side of said tubes by a plurality of crevice regions, said secondary side having deposits on its surfaces and in said crevice regions, the method comprising the steps of:

introducing a first liquid containing a cleaning agent into said secondary side, said first liquid being operative to solubilize at least a portion of the deposits on said surfaces of said secondary side;

removing at least a portion of said first liquid and solubilized deposits contained therein from said secondary side;

introducing a second liquid containing a cleaning agent into said secondary side, the concentration of cleaning agent in said second liquid being greater than that in said first liquid;

supplying heat to said second liquid through said tubes from said primary side while maintaining a pressure on said secondary side equal to or greater than the saturation pressure;

reducing the pressure on said secondary side to below the boiling point pressure to effect boiling of said second liquid in said crevice regions of at least a first of said tube support plates;

terminating the step of reducing the pressure and returning the pressure on said secondary side to at least the saturation pressure;

maintaining said second liquid within said secondary side for a time sufficient to solubilize deposits in said crevice regions.

* * * * *